Patented Sept. 9, 1930

1,775,197

UNITED STATES PATENT OFFICE

VITA HABIF, OF DETROIT, MICHIGAN

SOLDERING SOLUTION

No Drawing. Continuation of application Serial No. 439,534, filed March 27, 1930. This application filed June 9, 1930. Serial No. 460,096.

This invention relates to solutions such as are commonly employed in soldering operations, and is a continuation of my application for Letters Patent of the United States, filed March 27th, 1930, Serial Number 439,534.

The objects of the present invention are to provide a soldering solution that will not, during a soldering operation, give off gases detrimental to the health of the workman conducting the operation; that is free of acids such as are commonly employed in connection with conventional soldering solutions; that is free of corrosive elements tending to impregnate the metal during the soldering operation, or injure the hands of the workmen using the solution, that is highly fluid; and that is simple to prepare, economical to produce, and efficient in operation.

Other objects will be specifically pointed out or will be apparent in the following specification.

In the conventional types of soldering solutions, paste or the like now found on the market, an acid is included as an essential element. When this acid is heated during the soldering operation fumes are given off from the same which are often drawn into the lungs of the workmen conducting the operation and often causes physical disablement of the workman. This danger has long been recognized and various means have been attempted in order to eliminate the deleterious effects thereof.

Furthermore, in employing such acid in the soldering solution, the acid attacks the metal upon which it is used and penetrates the pores of same in such a manner that it is substantially impossible to completely eliminate its presence upon subsequent washing. For this reason, after the article which has been soldered has been put into use the acid slowly works out of the pores and attacks the surface of the metal, with the result that such surface becomes corroded or oxidized and not only presents an unsightly appearance, but the strength of the soldered joint is materially impaired. Furthermore, such solutions attack and injure the hands of the workmen using the same.

The present invention has been designed primarily to obviate the disadvantages above outlined in connection with conventional soldering solutions, and by its use not only are dangerous gases eliminated during the soldering operation, but subsequent corrosion of the surface of the metal is eliminated as far as absorbed acid is concerned and contact of the solution with the hands of the workmen using the same has no effect on the hands whatsoever.

In accordance with the present invention I form a soldering solution of a fluxing agent, a cleaning agent which will dissolve grease and which may also serve as a thinner, an adhesion agent, and preferably an agent for dissolving the above mentioned agent and which may serve to dilute the solution. The fluxing agent I employ is chloride of zinc. The metal cleaning and grease dissolving agent is preferably one of the alcohols, preferably denatured alcohol because of its relative cheapness and because this material will mix readily with water when the latter is employed for dissolving the other agents, and also because it may be employed as a thinner if desired. In addition, alcohol is preferably employed because it eliminates any corrosion that might otherwise occur by the use of the fluxing agent. The adhesive agent may be glycerine, molasses or any other syrupy material which will act to cause the solution to adhere to the surface to be soldered, and it is preferably a material which will not injuriously affect either the metal or the hands of the workman employed in the soldering operation. The dissolving agent is preferably water because of its relative cheapness. These materials are mixed together in suitable proportions to form a mixture of relative fluidity which will readily and quickly spread over the surface to be soldered, it preferably having a Baumé reading of about 22, altho in some cases it may vary between 14 and 50.

These various elments may be mixed together in a number of different proportions which may depend, to a great extent upon the particular material being soldered and the conditions under which the soldering operations take place, as well as proper consideration of economy in employing the same in production. Broadly speaking, they may be mixed together in the following proportions by volume.

| | |
|---|---|
| Chloride of zinc | 10 to 50% |
| Glycerine | a trace to 50% |
| Alcohol | 5 to 50% |
| Water | 0 to 50% |

A mixture that I have found satisfactory is as follows:

| | Per cent |
|---|---|
| Chloride of zinc | 38 |
| Glycerine | 2 |
| Alcohol | 20 |
| Water | 40 |

The above solution is employed in the soldering operation in the same manner as conventional soldering solutions and it will be apparent that because of its composition no acid fumes will be given off, and that there is no acid to penetrate the pores of the metal and later work out through the surface to cause corrosion of the same, or to affect the hands of workmen. The only fumes that will be given off from this solution will be the fumes of the alcohol and the glycerine which in the quantities that will be present are entirely harmless to the health of those who may happen to breathe a small amount of the same into their lungs.

A feature of the solution is the ability to be diluted with water without causing a separation of the various constituents, this being normally impossible with most solutions because of such separation.

It may also be desirable to add a small amount of coloring matter to the solution so as to make it more easily identified, a color such as purple having been found satisfactory for this purpose.

Formal changes may be made in the specific embodiment of the invention described without departing from the spirit or substance of the broad invention, the scope of which is commensurate with the appended claims.

What I claim is:

1. A soldering solution comprising 10% to 50% of chloride of zinc, ½ of 1% to 50% of glycerine, 5% to 50% of alcohol, and 1% to 50% of water.

2. A soldering solution comprising approximately 38% chloride of zinc, 2% glycerine, 20% alcohol, and 40% water.

3. A soldering solution comprising 10% to 50% zinc chloride, 5% to 50% alcohol, ½ of 1% to 50% of an adhesive soluble in water, and 1% to 50% water.

4. A homogenous non-separating soldering solution, comprising, 30% to 50% of zinc chloride, a trace to 20% of glycerine, 10% to 30% of alcohol, and 30% to 40% of water.

5. A water soluble soldering solution, comprising, 40% to 65% of zinc chloride, ½ of 1% to 25% of glycerine and 13% to 40% of alcohol.

VITA HABIF.